United States Patent
Kang et al.

(10) Patent No.: US 7,014,665 B2
(45) Date of Patent: Mar. 21, 2006

(54) SELECTIVE APPLICATION OF CHEMICAL AGENTS IN THE PATTERN DYEING OF TEXTILES

(75) Inventors: Peter K. Kang, Spartanburg, SC (US); Daniel T. McBride, Chesnee, SC (US); Anthony R. Chambers, LaGrange, GA (US); Edwin L. Hersey, LaGrange, GA (US); Jon L. Williamson, LaGrange, GA (US); Richard L. Kilpatrick, LaGrange, GA (US); Cleatus D. Little, LaGrange, GA (US); Randy G. Meeks, LaGrange, GA (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 10/752,204

(22) Filed: Jan. 6, 2004

(65) Prior Publication Data

US 2004/0172773 A1    Sep. 9, 2004

Related U.S. Application Data

(60) Provisional application No. 60/439,748, filed on Jan. 13, 2003.

(51) Int. Cl.
*D06P 5/00*    (2006.01)
(52) U.S. Cl. .................... 8/484; 8/478; 8/485; 8/558; 8/561; 8/555
(58) Field of Classification Search .................. 8/478, 8/481–485
See application file for complete search history.

(56) References Cited

U.S. PATENT DOCUMENTS

| | | | | |
|---|---|---|---|---|
| 2,321,974 A | * | 6/1943 | Bird | 8/479 |
| 3,802,177 A | * | 4/1974 | Sekiguchi et al. | 57/253 |
| 4,074,970 A | * | 2/1978 | Feigin | 8/539 |
| 4,110,367 A | * | 8/1978 | Papalos | 562/46 |
| 4,378,225 A | * | 3/1983 | Shah et al. | 8/484 |
| 4,494,956 A | * | 1/1985 | Schafer et al. | 8/543 |
| 4,612,016 A | * | 9/1986 | Jaeger et al. | 8/543 |
| 4,808,191 A | * | 2/1989 | Gregory et al. | 8/478 |
| 5,106,416 A | * | 4/1992 | Moffatt et al. | 106/31.43 |
| 5,116,409 A | * | 5/1992 | Moffatt | 106/31.43 |
| 5,133,803 A | * | 7/1992 | Moffatt | 106/31.37 |
| 5,320,668 A | * | 6/1994 | Shields et al. | 106/31.28 |
| 5,554,198 A | * | 9/1996 | Poplin | 8/482 |

* cited by examiner

*Primary Examiner*—Margaret Einsmann
(74) *Attorney, Agent, or Firm*—Terry T. Moyer; Daniel R. Alexander

(57) ABSTRACT

A dyed substrate having at least one dyed surface. At least one dye solution is disposed across at least a portion of the surface in combination with a migration promoting composition and/or a migration limiting composition. The migration promoting composition and/or migration limiting composition adjusts the migration of at least a portion of the dye solution across the substrate in a controlled manner. Dye migration may be arrested by the application of RF (radio frequency) energy as a step in dye fixation. A process for forming the dyed substrate is also provided.

36 Claims, 9 Drawing Sheets

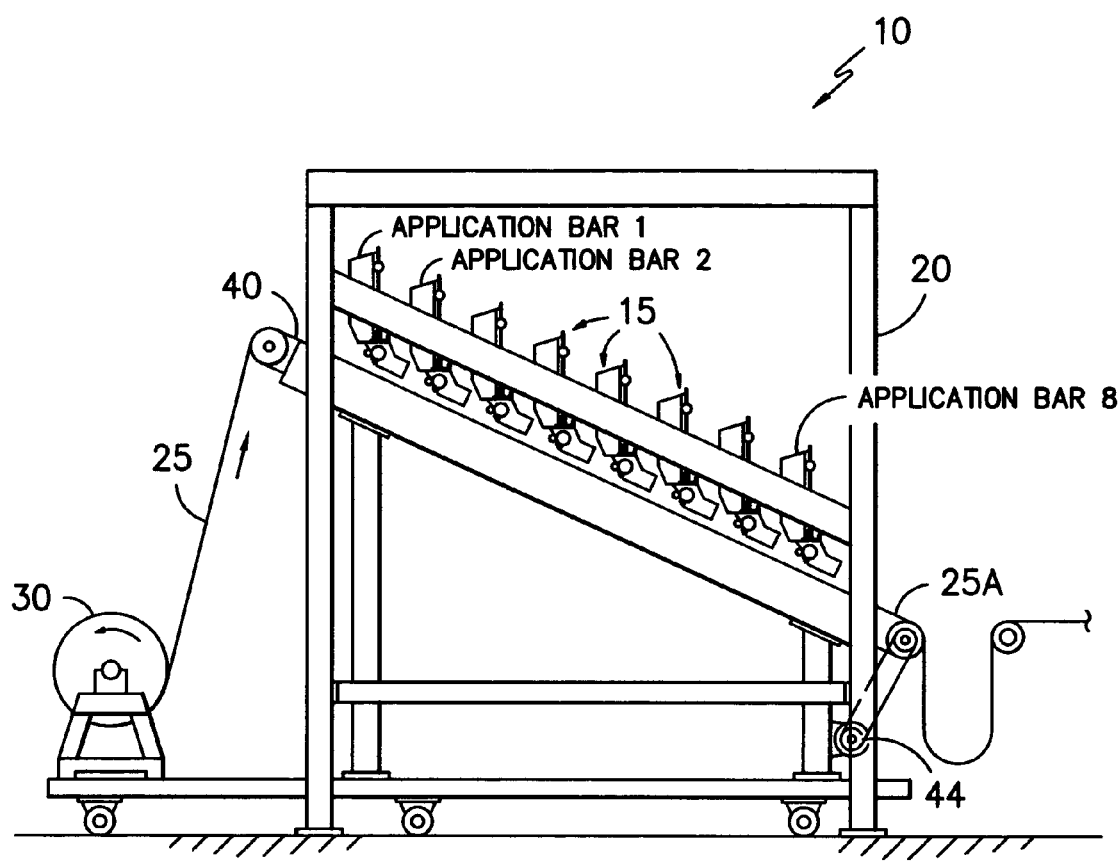
FIG. —1—

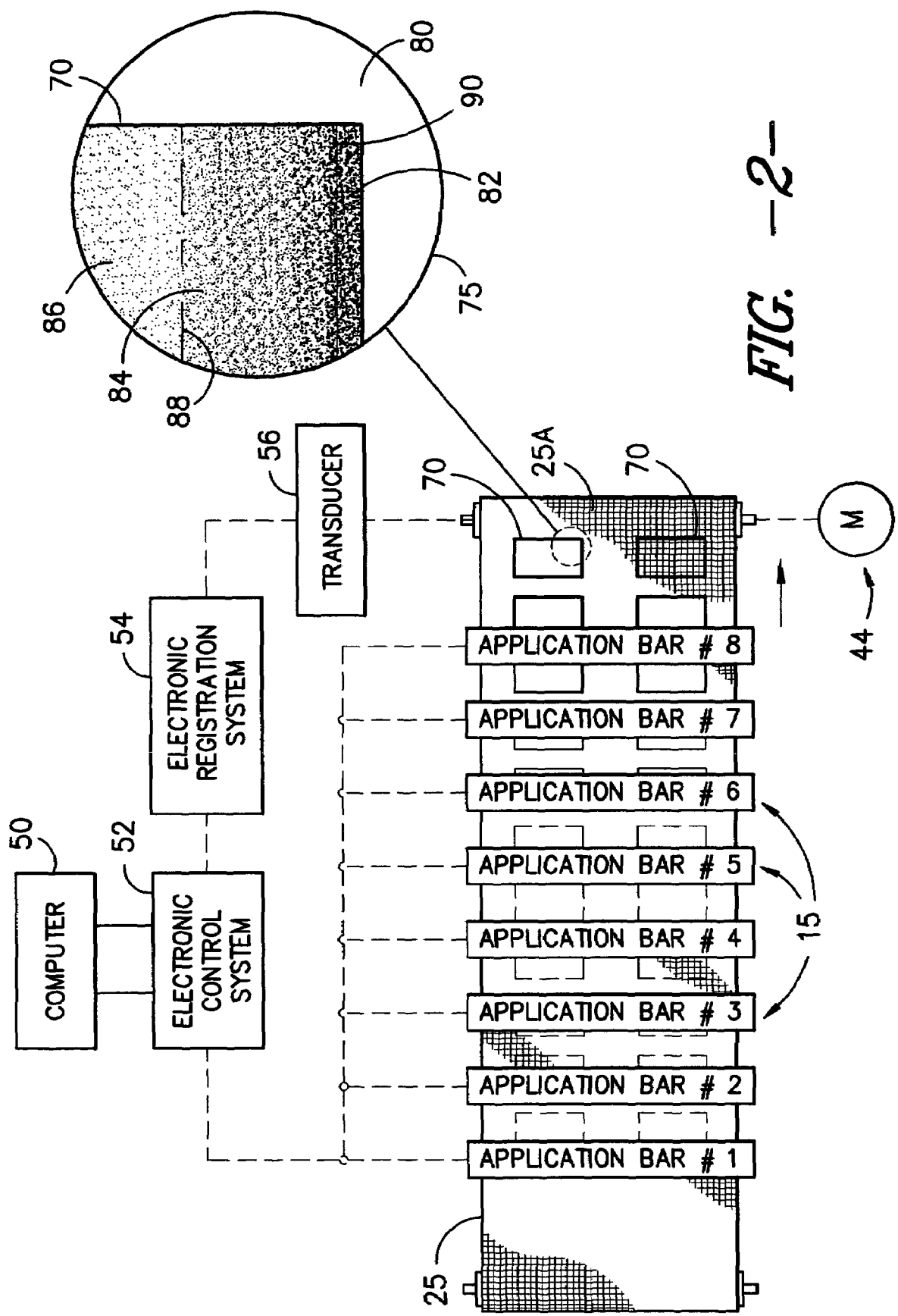
FIG. -2-

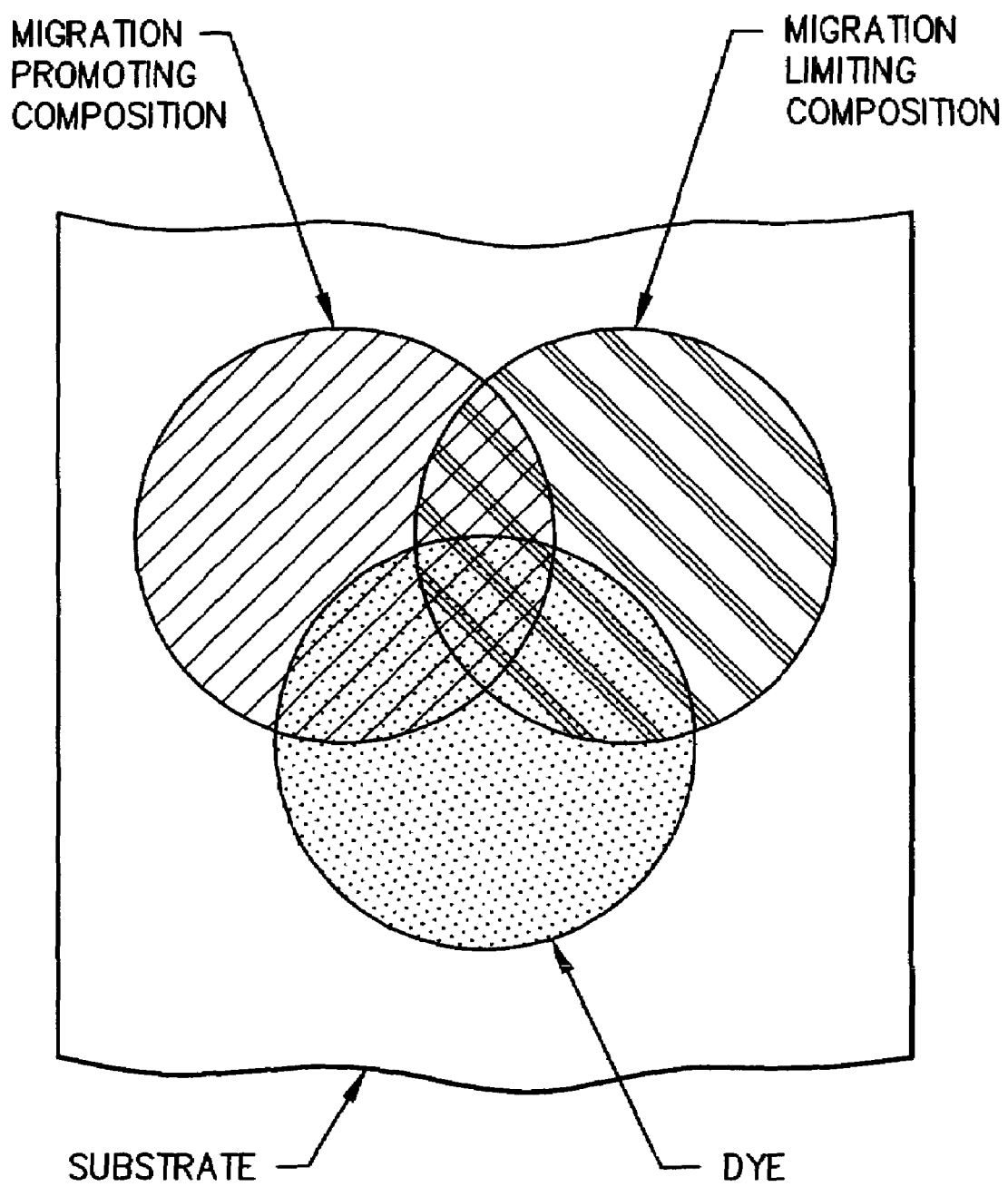
FIG. -2A-

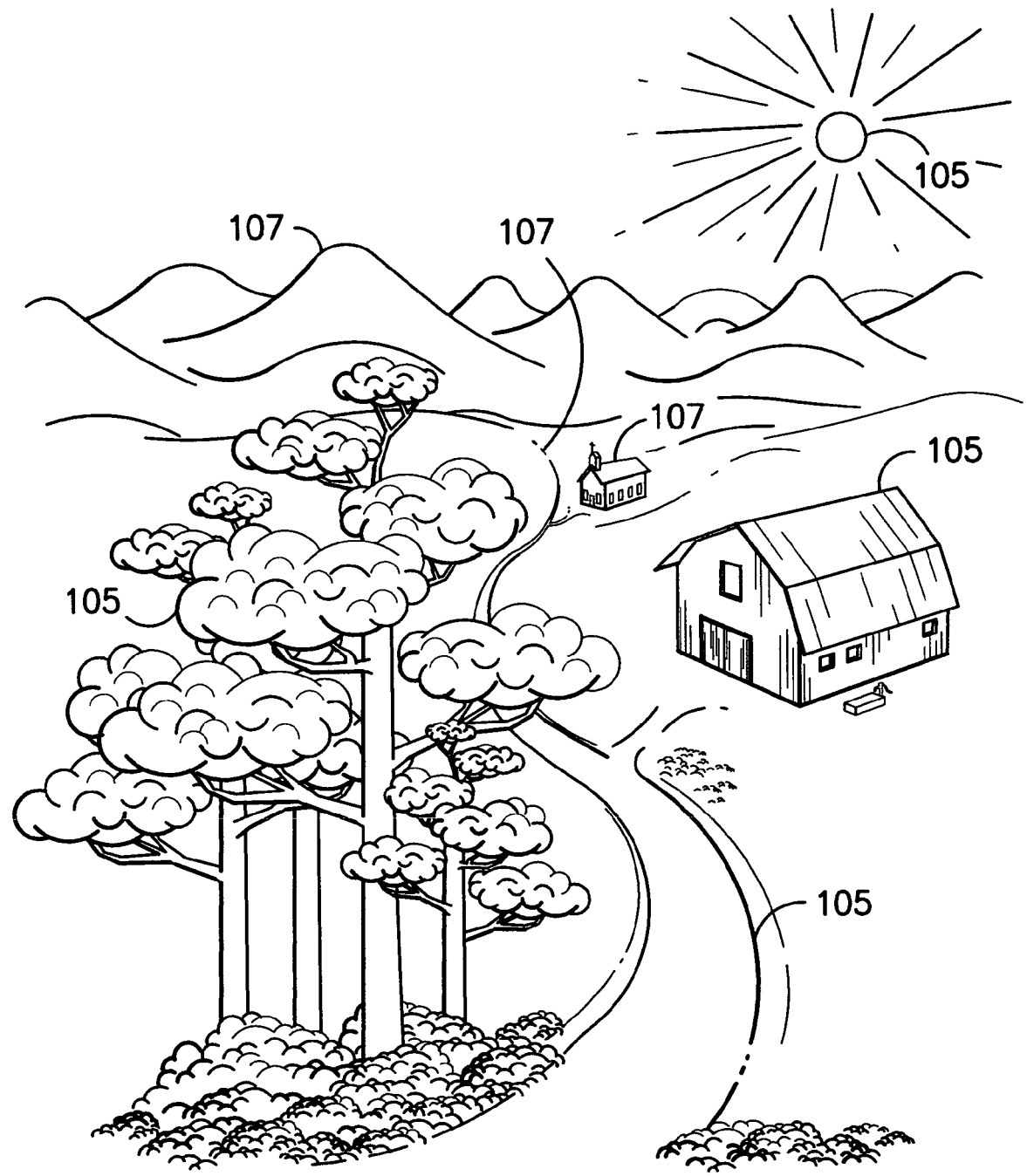
FIG. -3-

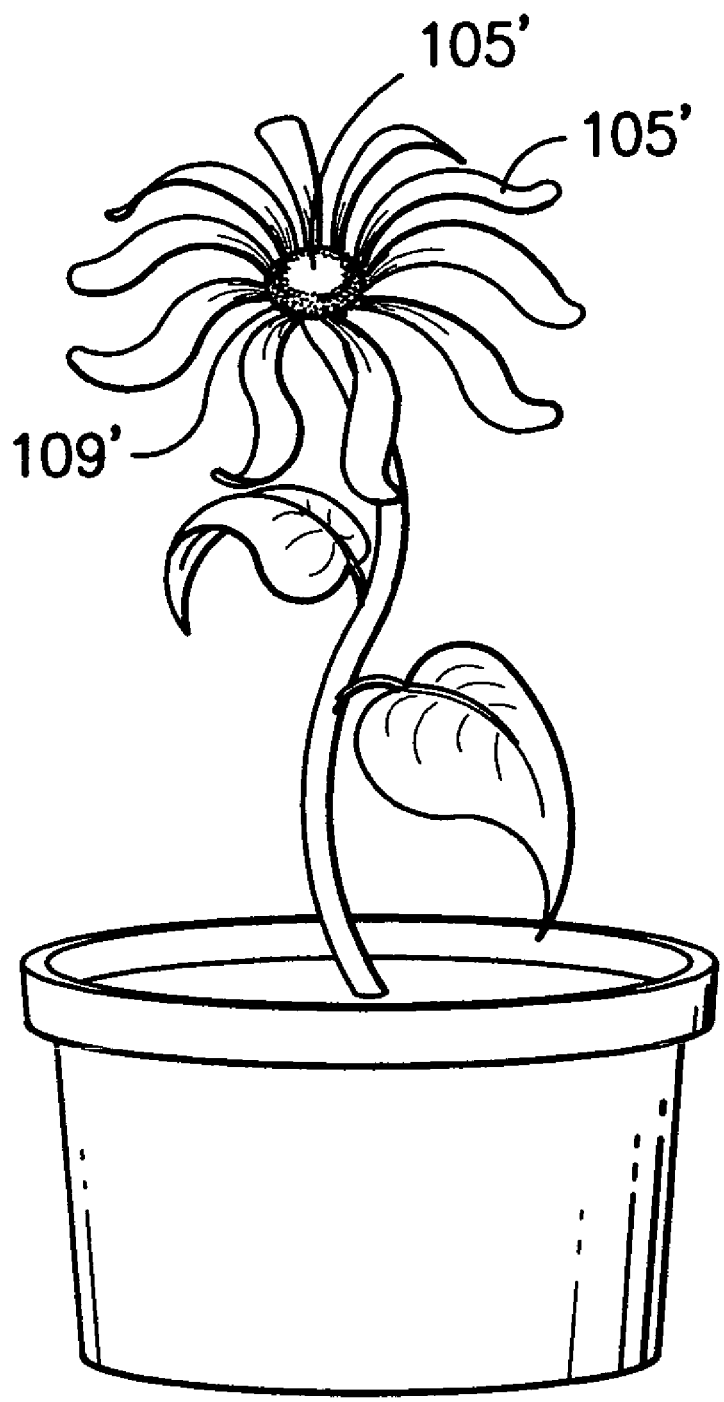
FIG. —4—

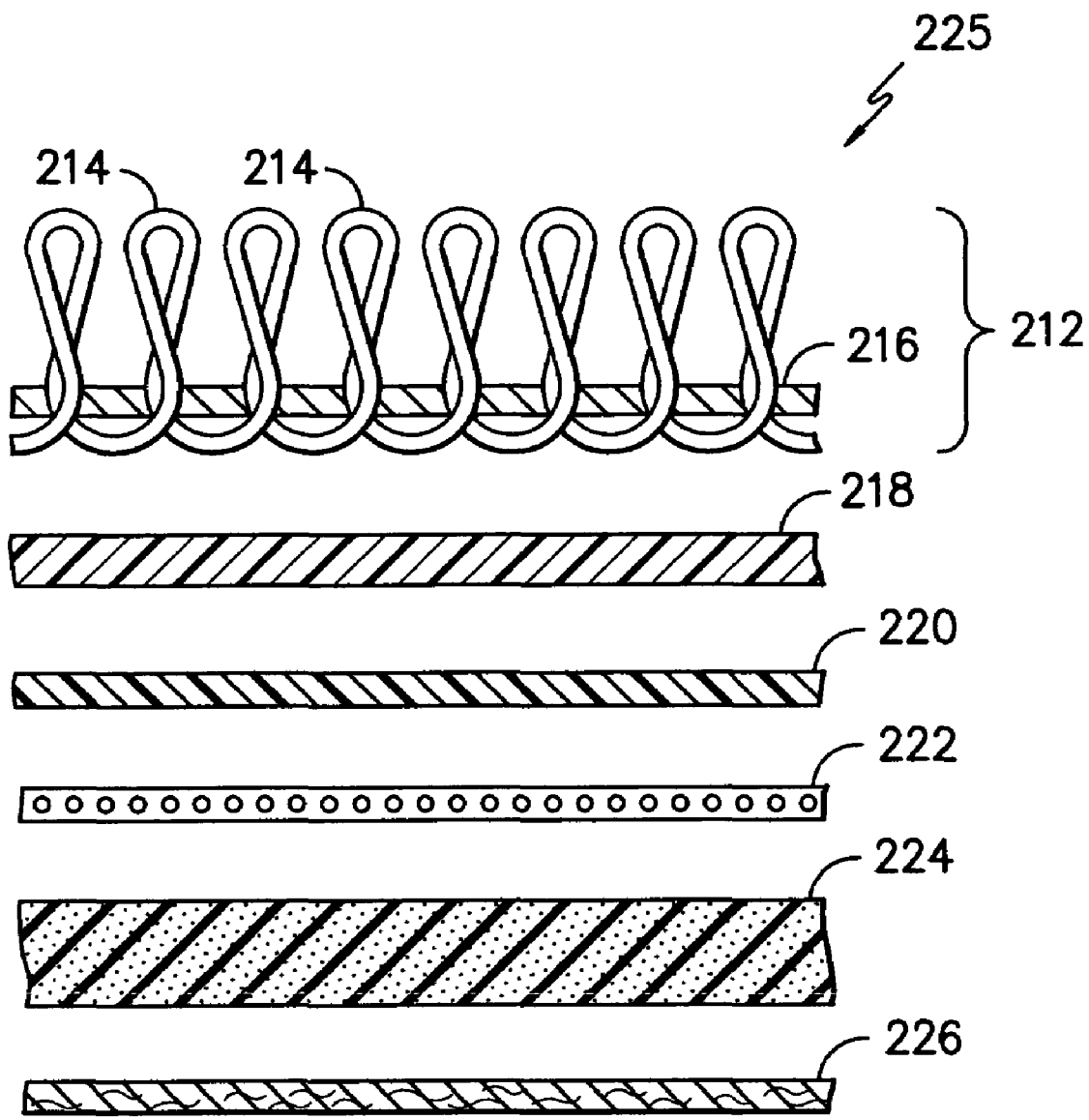
FIG. -5-

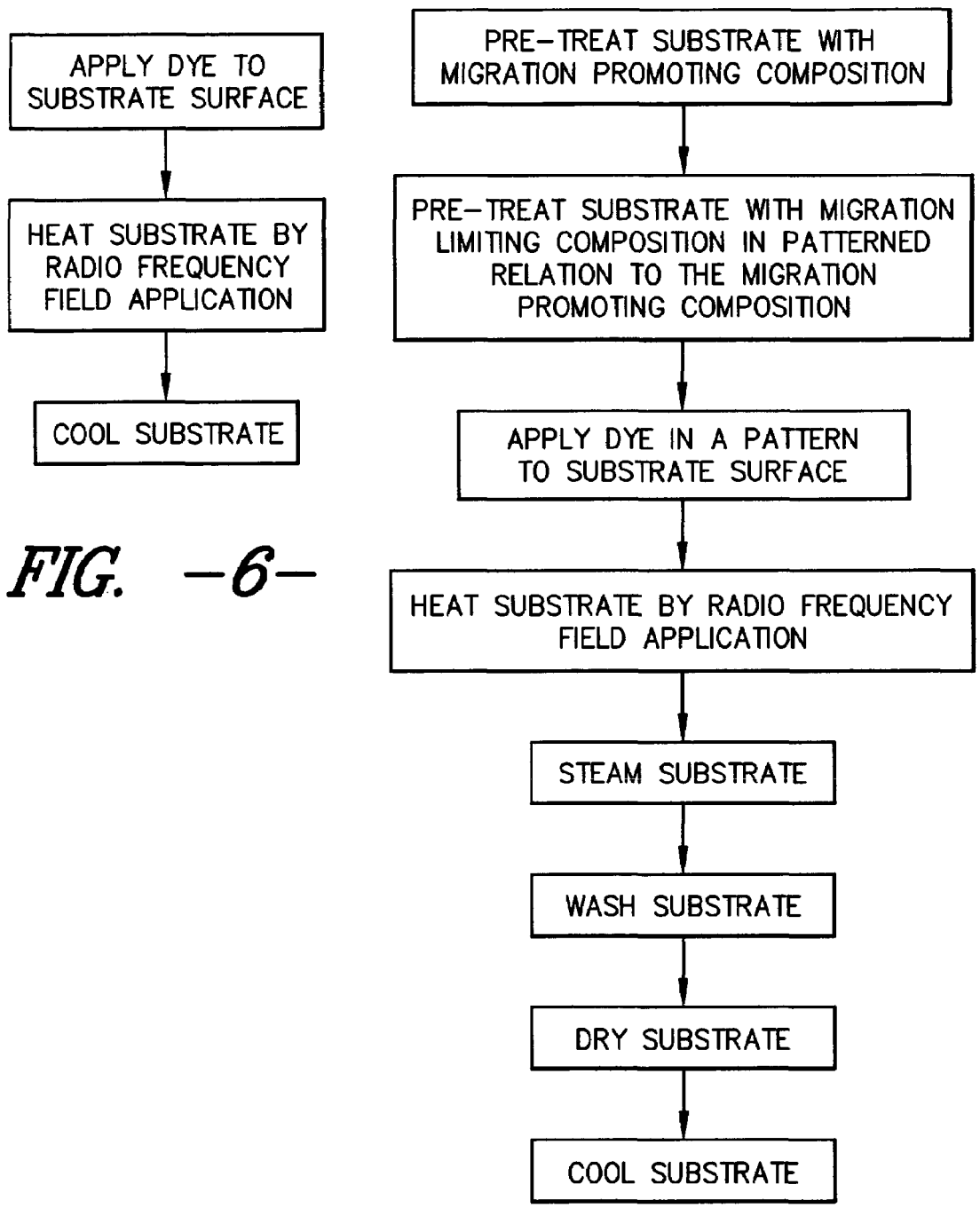
FIG. -6-
FIG. -7-

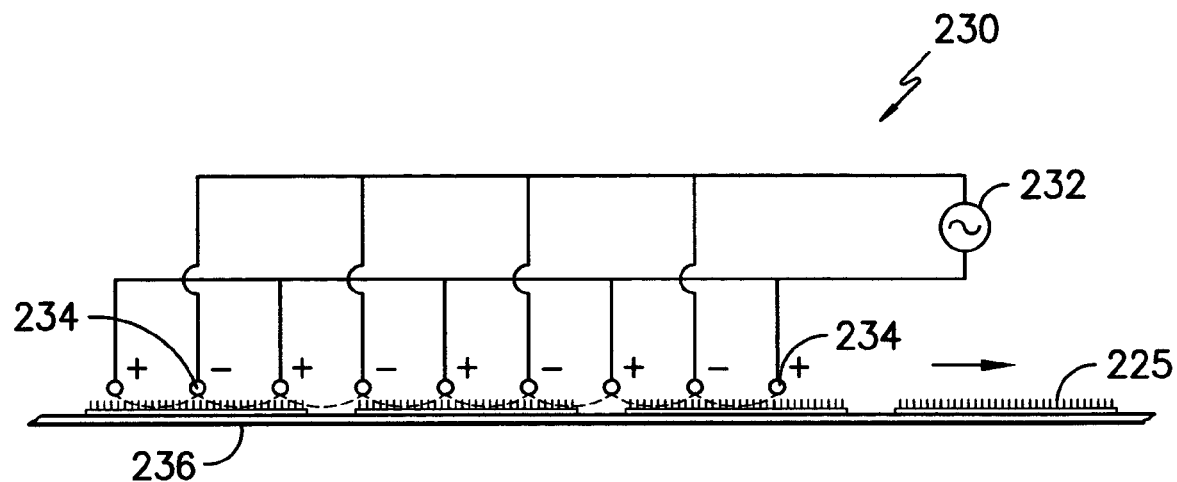
FIG. -8-
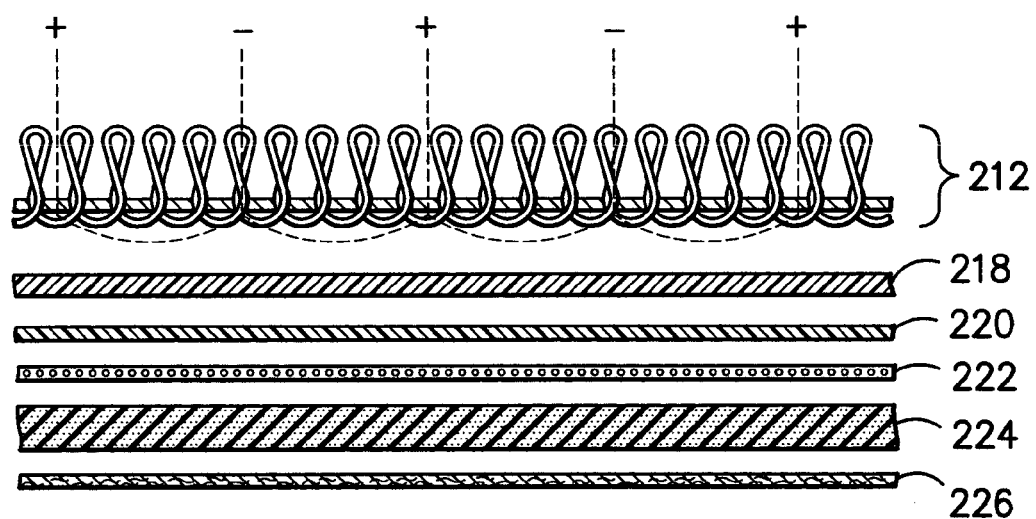
FIG. -9-

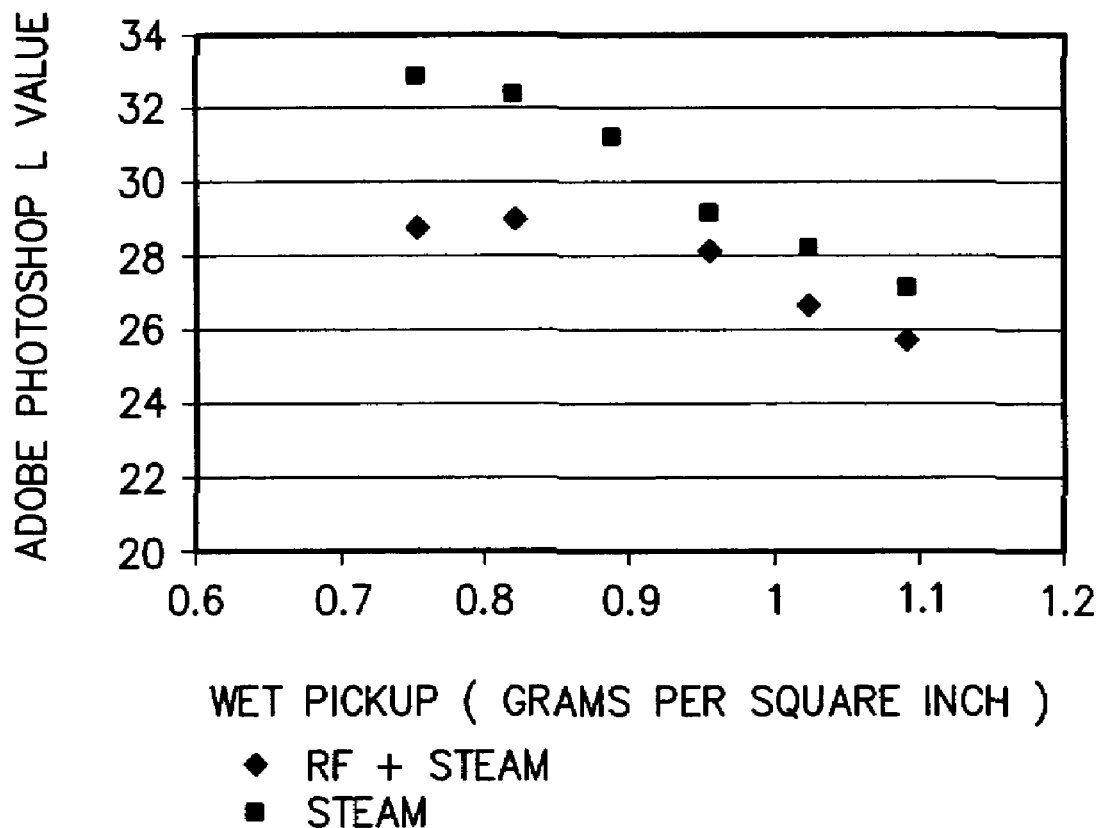
FIG. -10-

SELECTIVE APPLICATION OF CHEMICAL AGENTS IN THE PATTERN DYEING OF TEXTILES

CROSS-REFERENCE TO RELATED APPLICATION

This application claims the benefit of and priority to U.S. Provisional Application No. 60/439,748, filed Jan. 13, 2003.

This invention relates to a process for dyeing a dye accepting substrate in either a pattern or solid shade by dispensing a dye or liquid colorant using a plurality of colorant applicators. More specifically, this invention is directed to a process in which the dye or liquid colorant is used in combination with the selective application of various chemical agents that affect and control the migration of the dye or liquid colorant on the substrate. The selective use of such chemical agents, may enhance the definition of patterned designs across the substrate. More particularly, the controlled application of such chemical agents in relation to the application of dye or liquid colorant may be used (i.) to enhance blending of discretely applied dye or liquid colorants at selected zones across the substrate and/or (ii.) to curtail color migration of dye or liquid colorant between selected zones across the substrate thereby sharpening boundaries between patterned zones. The use of such controlled color blending and containment individually or in combination with one another may be useful in both solid colored as well as patterned substrates. The practices of the present invention may be used to provide enhanced freedom in color blending. In addition, the ability to deliberately and selectively introduce non-uniform dye migration into a pattern (either alone or in combination with dye containment at selected zones within the pattern) may be used to emphasize certain pattern areas or elements, creating three-dimensional effects, and other desirable visual effects.

BACKGROUND

It is generally known to color absorptive substrates such as textiles by discrete localized dye application. Generally, such discrete application processes for textiles have evolved along two different approaches. In a first approach (the "drop on demand" approach), a liquid coloring medium such as a dye or liquid colorant is applied directly from valved applicators positioned over the textile substrate to be patterned. In an example of one such system, a valve is opened when the dye or colorant is to be dispensed onto the substrate, and is closed when the requisite quantity of dye has been delivered to the appropriate predetermined area of the substrate.

In one configuration of a "drop on demand" device, a print head containing a plurality of individual dye nozzles is traversed across the path of a substrate to be patterned. One or more dye nozzles may be separately connected to individual dye supplies, each of which may supply dye of a respectively assigned color and provide for multi-color patterning, thereby allowing that applicator to dispense dye of a pre-determined color. Electronically-defined patterning data, in the form of "on-off" instructions, are directed to selected nozzles to dispense dye of the various desired colors onto the substrate as the print head is traversed across the width of the substrate and the substrate is sequentially indexed forward, thereby allowing the dye nozzles comprising the print head to trace a raster pattern across the face of the substrate and dispense dyes of the desired colors on any desired area of the substrate dictated by the selected pattern.

In order to carry out drop on demand application, the dye applicators also may be arranged in a stationary row positioned across the path of the substrate, with applicators for a given color dye being arranged along the length of the row, perhaps intermingled with applicators dispensing dyes of different colors. Alternatively, multiple stationary rows may be used, and the dye applicators for a given color may be restricted to a given row, or may be assigned to different rows. In either case, the pattern control system must provide compensation for the location of the applicators in relation to the substrate. For example, in the multiple-row case, the control system must compensate for the distance between adjacent rows by delaying the patterning instructions for applicators on downstream rows by the time interval necessary for the substrate to travel the distance to these rows. The rows may be arranged in substantially parallel, closely adjacent proximity, aligned substantially transverse to the path of the substrate, or may be arranged in bars that are positioned in some other pre-determined, spaced relation along the path of the substrate to be patterned.

A second approach to discrete dye application is the "recirculating" approach wherein individual dye applicators are associated with a given color. The applicators may be arranged in a fixed orientation relative to a moving textile substrate such as in a series of parallel rows arranged in spaced relation along the path of the moving substrate. However, rather than dispensing dye only when required by the pattern, the applicators in the re-circulating approach are always "on" and thus continuously generate a stream of dye that is directed into a catch basin associated with each row. The dye solution stream can reach the substrate only when it is diverted onto the path of the substrate by an intermittently-actuated (i.e., actuated in accordance with pattern data) transverse stream of air or other control fluid that changes the trajectory of the dye stream and causes the dye stream to avoid the catch basin and strike the surface of the substrate for a time interval sufficient to dispense the quantity of dye specified by the electronically defined pattern data. Separate sets of applicators and corresponding catch basins are used so that dye that is directed into a specific catch basin can be collected and re-circulated to the row of dye applicators assigned to that color dye.

An example of such a device is indicated in FIGS. 1–2, the details of which are discussed below, as well as in a number of U.S. Patents, including commonly-assigned U.S. Pat. Nos. 4,116,626, 5,136,520, 5,142,481, and 5,208,592, the teachings of which are hereby incorporated by reference.

In the devices and techniques described in the above-referenced U.S. patents, the substrate pattern is defined in terms of pixels, and individual colorants, or combinations of colorants, are assigned to each pixel in order to impart the desired color to that corresponding pixel or pixel-sized area on the substrate. The application of such colorants to specific pixels is achieved through the use of many individual dye applicators, mounted along the length of the various color bars (also known as application bars) that are positioned in spaced, parallel relation across the path of the moving substrate to be patterned. Each applicator in a given application bar is supplied with colorant from the same colorant reservoir, with different application bars being supplied from different reservoirs, typically containing different colorants. By generating applicator actuation instructions that accommodate the position of the applicator along the length of the application bar and the position of the application bar relative to the position of the target pixel on the moving substrate, any available colorant from any application bar may be applied to any pixel within the pattern area on the substrate, as may be required by the specific pattern being reproduced.

Regardless of the process by which the dye is dispensed onto the textile substrate surface, various chemical agents sometimes have been applied to the substrate using techniques such as baths, pads, sprayers, or other appropriate devices. Using such devices, surfactants or other dye migration modifying agents have been applied substantially uniformly to the surface of the substrate prior to the patterning step of selectively applying dyes in accordance with pattern information, as is set forth in, for example, commonly-assigned U.S. Pat. Nos. 4,740,214 and 4,808,191 both of which are incorporated by reference as if fully set forth herein.

While the prior practices have been used to provide both uniform and patterned coloration across various substrates, it is believed that the processes of the prior art have not fully realized two desirable capabilities: first, the ability to enhance, selectively and preferentially within a single pattern, the performance of in situ blending within a pattern, and second, the ability to impart, selectively and preferentially within a single pattern, a visual emphasis or sense of three dimensionality or, conversely and concurrently, a visual de-emphasis or sense of two dimensionality.

SUMMARY

The present invention provides advantages and alternatives over the prior art by utilizing the selective controlled application of dye-migration-controlling agents in combination with dye application across a substrate to effect controlled dye blending and enhanced pattern definition. Upon achievement of the desired blending and pattern definition, the applied dye is fixed across the substrate to prevent decay of the developed pattern.

According to one aspect of the invention the selective application of dye-migration-controlling agents may be carried out in registration with or otherwise in relation to a dye pattern such that the migration or diffusion characteristics of the dispensed dye on the substrate may be modified in specific, predetermined areas of the pattern to provide patterned products having a variety of visual effects thereby providing a wide variety of aesthetic advantages. In particular, a dye solution may be applied across a substrate in a controlled manner in combination with a migration promoting composition and/or a migration limiting composition. If desired, the dye solution may be applied substantially in registry with the migration promoting composition, the migration limiting composition or in registry with patterned combinations of the migration promoting composition and the migration limiting composition across the substrate.

According to another aspect of the present invention a dye pattern may be positionally fixed across a textile substrate by the dual complementary mechanisms of chemical migration controlling agents in combination with RF (radio frequency) heating to arrest further dye migration and or blending through fixation of applied dye and dye blends. The use of such RF heating thus further enhances pattern definition.

BRIEF DESCRIPTION OF THE DRAWINGS

The invention will be further described by reference to the accompanying drawings which are incorporated in and which constitute a part of this specification and in which:

FIG. 1 schematically depicts an exemplary patterning device in which a plurality of individually controllable applicators, arranged along the length of a series of application bars, are deployed across the path of a substrate web to be patterned;

FIG. 2 schematically depicts a plan view of the device of FIG. 1, showing patterned areas of the substrate, intended to be colored;

FIG. 2A is a Venn diagram illustrating logically and positionally various arrangements of dye, migration limiting composition, migration promoting composition and combinations thereof across a substrate;

FIG. 3 depicts a first exemplary pattern to be placed on a selected substrate, useful in describing one set of possible visual effects (i.e., depth/image enhancement) achievable using the teachings herein;

FIG. 4 depicts a second exemplary pattern, placed on a selected substrate, useful in describing a second set of possible visual effects (color range enhancement) achievable using the teachings herein;

FIG. 5 is an exploded schematic view of an exemplary multi-layered carpet construction;

FIG. 6 is a simplified process flow diagram for dye application and fixation of dye within a carpet pile;

FIG. 7 is an expanded flow diagram illustrating a sequence of steps in the preparation of a carpet including the application and fixation of dye to the pile surface;

FIG. 8 illustrates a fringe-field radio frequency (RF) application unit including a plurality of electrodes extending across the travel path of a carpet tile for application of a drying electric field; and FIG. 9 is an exploded side view similar to FIG. 5 illustrating the RF field applied to a substantially controlled depth within a carpet structure; and FIG. 10 is a graph illustrating improved dyeing using RF preheat.

While various aspects of the invention will hereinafter be described and disclosed in connection with certain exemplary embodiments, practices, and procedures, it is by no means intended to limit the invention to any such specific embodiments, practices, or procedures as may be the subject of illustration and/or description.

Rather, it is intended to cover all alternatives and modifications as may fall within the true spirit and scope of the invention and all equivalents thereto.

DETAILED DESCRIPTION

FIG. 1 shows an exemplary jet dyeing apparatus 10, such as a Millitron® textile patterning machine developed by Milliken & Company of Spartanburg, S.C., comprised of a set of eight individual application bars (also known as color bars) 15, with each application bar capable of dispensing dye of a given color, and/or a dye-migration-controlling agent. Thus, by the term "application bar" is meant any application unit adapted to deliver at least one of a coloring agent or at least one dye-migration-controlling agent in a defined pattern to the substrate 25. Of course, a greater or fewer number of application bars may be used, depending upon the desired complexity of the apparatus, the need for a wide range of colors, and other factors.

In the exemplary apparatus, each application bar 15 is comprised of a plurality of individually controllable fluid applicators or jets arranged in spaced alignment along the length of the bar and supplied with the chemical agent or colorant assigned to that bar. The number of applicators per unit length of the applicator bar may be, for example, ten to the inch, twenty to the inch, or some other number. Each application bar preferably extends across the full width of substrate 25. As depicted, unpatterned substrate 25, such as a textile fabric, may be supplied from roll 30 and is transported through frame 20 and under each application bar 15 by conveyor 40, which is driven by a motor indicated generally at 44.

After being transported under application bars 15 in a manner that provides for the accurate pixel-wise placement of dye-migration-controlling agents and dye solution in precisely-defined areas of the substrate, the patterned substrate 25A may be passed through other, dyeing-related steps such as drying, fixing, etc. For example, the pattern-dyed, textile material may be passed through an RF heater as will be described further hereinafter. The dyed textile material leaving the RF heater may then be conveyed through a steam fixation unit to finalize dye fixation. A water wash may be used to remove excess unfixed dyes and other chemicals. The washed textile material may then be passed through a dryer and take-up means.

FIG. 2 is a schematic plan view of the patterning device of FIG. 1. Included in this view are block representations of computer system 50 associated with electronic control system 52, electronic registration system 54, and rotary pulse generator or similar transducer 56. The collective operation of these systems results in the generation of individual "on/off" actuation commands that control the flow of fluid from the application bars to the substrate in a controlled manner. By way of example only, and not limitation, such control systems are described in more detail in commonly-assigned U.S. Pat. Nos. 4,033,154, 4,545,086, 4,984,169, and 5,208,592, each of which is hereby incorporated by reference herein in its entirety.

While the invention herein is described in terms of this recirculating-type device, the teachings herein are not limited to such devices, but may also be used with devices of the drop-on-demand type. With either approach, textiles may be patterned using a wide variety of natural or synthetic dyes, including acid dyes, basic dyes, reactive dyes, direct dyes, disperse dyes, mordant dyes, or pigments, depending upon the application and the fiber content of the substrate to be dyed. The teachings herein are applicable to the use of a broad range of such dyes, as well as a broad range of textile materials. Textile materials which can be pattern dyed by means of the present invention include knitted, woven, and non-woven textile materials, tufted materials, bonded materials and the like. Typically, but not necessarily, such textile materials will include a pile surface. Such textile materials may include floor coverings (e.g., carpets, rugs, carpet tiles, floor mats, etc.), drapery fabrics, upholstery fabrics (including automotive upholstery fabrics), and the like. Such textile materials can be formed of natural or synthetic fibers, such as polyester, nylon, wool, cotton and acrylic, as well as textile materials containing mixtures of such natural or synthetic fibers, or combinations thereof.

To facilitate the discussions below, the following definitions shall be used unless otherwise indicated or demanded by context.

The term "patterning" shall mean the selective application of dye, in accordance with predetermined data, to specified areas (or the total area) comprising the surface of a substrate. Patterning can involve arrangements of multiple colors, or the uniform application of a single color to the entire substrate.

The term "pattern configuration," when used to indicate the placement of dyes or chemicals on the substrate, shall mean placement in accordance with the pattern to be reproduced. One example of placement in pattern configuration is placement in registry with the various colored areas comprising the pattern. However, placement in pattern configuration may also merely refer to placement in relation to certain pattern elements, where such placement may not necessarily be in registry with those pattern elements (as would occur if, for example, a chemical agent were applied in an irregularly-shaped area situated a pre-determined distance away from the edge of a pattern element) in order to achieve one or more of the effects made possible by the teachings herein.

The term "pixel" shall be used to describe the smallest area or location on the substrate to which a color or corresponding quantity of colorant can be accurately and reliably applied. Accordingly, the pixel is the basis on which patterns are defined and, for the patterning devices discussed herein, the basis for generating the dye applicator actuation commands required to reproduce those patterns. The derived term pixel-wise is used to describe the assignment or application of dye or other liquid to specific pixel-sized locations on the substrate, for example, as would occur in reproducing a pattern or pattern element defined in terms of pixels.

The term "dye solution" shall mean a liquid mixture of various components, including dye (of any suitable kind) and, optionally, other additives such as are taught herein, that is dispensed onto the substrate. Dye solution is to be distinguished from "dye" or "colorant," the latter terms referring instead to the actual dye or colorant component of the dye solution.

The term "process color" shall mean the color of a dye or colorant as it is applied to the substrate, prior to any mixing or blending with any other dye or colorant. The set of process colors are the colors from which all other colors to be generated on the substrate must be constructed.

The term "substrate" shall mean any dye accepting substrate including but not limited to textiles comprised of individual natural or synthetic yarns. Textile substrates for which the processes described herein are particularly suited include fabrics and floor coverings, including carpets, rugs, carpet tiles, and floor mats. However, the teachings herein are fully applicable to the patterning of fabrics such as interior design fabrics (e.g., drapes, napery, upholstery fabrics, wall hanging fabrics, etc.), fabrics used in banners or other graphic signage, automotive fabrics (e.g. fabrics for door panels, seats, bolsters, inserts, headliners, trays, trunk liners, etc.), apparel fabrics, and other fabrics.

The term "level" shall mean the degree to which areas of the substrate dyed the same color exhibit visually uniform color. Dyed areas having poor level exhibit a mottled or heathered appearance.

The terms "diffusion" or "diffuse" shall mean having a soft, relatively unfocused appearance or, as the context may dictate, the appearance resulting from the migration of dye from an area of relatively high dye concentration to an adjacent area having a relatively low dye concentration. A related term used herein is "soft focus," used to describe a pattern or image that has a diffused or slightly out-of-focus appearance.

The term "in situ blending" and its derivatives shall refer to the migration and mixing of dye after the dye has been applied to the substrate. In one example, dye of the same color is applied to adjacent pixels, and the migration of dye between adjacent pixels tends to promote a more uniform appearance within the dyed area of the substrate. In another example, dyes of two or more colors are applied to the same pixel, and the blending occurs primarily within the same pixel (and, to a lesser extent, in adjacent pixels due to the degree to which lateral migration of the dye takes place). In a third example, dyes of different colors are applied to adjacent pixels, with pixel-to-pixel migration taking place that effectively blends, to a greater or lesser extent, the various applied dyes to form a composite color. Of course, various combinations of the above (e.g., having multiple dyes applied to each of two or more adjacent pixels, with pixel-to-pixel migration taking place) are possible and may be advantageous under certain conditions.

The term "high relief" shall mean having a sharp, highly focused appearance giving the impression of a high degree of detail. This may be achieved, in accordance with the teachings herein, by the application of a dye migration inhibiting or retarding agent that effectively limits the degree to which dye is allowed to migrate or diffuse from the immediate area to which the dye was applied. Such migration or diffusion can be laterally (e.g., into adjacent pixels) or vertically (e.g., along the length of pile yarns occupying a given pixel on a carpet, rug, or pile fabric).

The term "loose saturation" shall refer to a condition in which fiber within a fiber bundle remains undyed thereby having the appearance of white pigmentation within the yarn bundle. The related term "frostiness" shall also refer to the appearance of lighter shade coloration at the tips of a fiber bundle relative to portions below the tips thereby making the surface appear as though portions remain undyed.

The term "superpixel" is used to describe a group of adjacent pixels, created to be used as a monolithic unit (i.e., it may be tiled within the pattern similar to individual pixels), within which in situ blending is encouraged. In effect, the in situ blending techniques used to create single pixels containing a blend of process colors are instead used within a multi-pixel structure.

Despite the fact that various embodiments of both prior art pattern dyeing approaches discussed above (i.e., drop-on-demand or re-circulating) have met with considerable success, improvements in some areas of performance have been pursued. One such area involves the flow or migration characteristics of the dye solution after it reaches the substrate, an area in which the teachings herein are directed. For example, within those areas of a pattern that require the uniform application of one or more dyes, it is not unusual to find areas having non-uniform color levels resulting in dyed areas having a subtle but visually apparent mottling effect due to small but significant pixel-to-pixel non-uniformities associated with insufficient pixel-to-pixel in situ blending or dye migration after the dye solution is applied to the substrate.

In order to enhance in situ blending it is generally known that the viscosity of the dye solution may be reduced so as to promote pixel to pixel dye migration. However, such reduced viscosity may also lead to the inability to achieve substantial definition or high relief in regions of the applied pattern. This may result in an uncontrolled slightly blurred boundary between various dyed segments. Reduced viscosity may also result in loose saturation or "frostiness" wherein yarn fibers remain undyed due to the reduced contact period with the colorant Processes according to the present invention addresses the seemingly contradictory need to promote in situ blending while at the same time promoting the development of high relief images across the substrate by the selective application of dye-migration-controlling agents across the substrate 25 (FIG. 2) such that applied dye is substantially contained at predefined zones across the substrate while controlled dye migration is permitted at other zones. In particular, a migration promoting surfactant is used in combination with migration limiting agents to develop a patterned arrangement of enhanced and limited migration zones across the substrate.

According to a first contemplated practice, at one of the first or second application bars, a migration promoting composition or "leveler" such as a surfactant of anionic character as described in U.S. Pat. No. 4,110,367 to Papalos (incorporated by reference) is applied either uniformly or in a desired pattern across the substrate 25. The character of the migration promoting composition is preferably neutral or of the same ionic character as the dye solution. Most preferably, the migration promoting composition is of the same ionic character to the dye solution and counter-ionic character to the substrate. Thus, if the substrate is nylon which is generally neutral or cationic in character, the migration promoting agent and dye solution will most preferably be anionic in character. By way of example only and not limitation, various contemplated migration promoting surfactants of anionic character include mixed fatty alcohol sodium sulfates, alkyl sulfonates, alkyldiaryl sulfonates, sulfonated sulphones dialkyl sulfosuccinates, alkane or alkene -amido-benzene-sulphonics, monosulfonated alkylphenoxy glycerol, alkyl-substituted diphenyl ether sufonates, and sulfonated alkylphenoxy acetones. It is also contemplated that corresponding sulfate or phosphate compounds may be used in place of any of the aforementioned sulfonated compounds. One anionic surfactant which is believed to be particularly useful is believed to be a sulfonate dispersion available under the trade designation TANAPURE AC from Bayer Corporation Industrial Chemicals Division having a place of business in Pittsburgh, Pa., USA.

At the other of the first or second application bars, a migration limiting composition may be applied. According to the preferred practice of the invention, the migration limiting composition is counter-ionic to the dye solution. In the event that the migration promoting composition is ionic in character, the migration limiting composition is preferably counter-ionic to the migration promoting composition. The application of the migration limiting composition may be either uniform across a zone where migration is to be limited or may be applied as a trace outline to define a boundary for migration prevention. Coverage by the migration limiting composition across a zone to be dyed facilitates the development of high relief coloration at that zone. Preferably, the migration promoting composition and the migration limiting composition are qualitatively and quantitatively counteractive to one another such that the blending of one with the other gradually shifts the character of a mixture from one migration characteristic to the other (i.e. from migration promoting to migration limiting and vise versa).

Of course, in the event that one or the other of the migration limiting composition or the migration promoting composition is to be applied uniformly across the entire surface of the substrate, it is contemplated that such application may be carried out by various application techniques such as pad coating, dip coating, spray coating and the like upstream of the application bars 15. If such a practice is utilized, a counteracting migration controlling composition may be applied in a pattern at a first application bar prior to dye impingement so as to adjust the migration character across the substrate 25. By way of example only, and not limitation, one or the other of the migration controlling compositions may be uniformly applied upstream of the application bars by a spray device or the like.

As will be appreciated, the application of a migration limiting composition of counter-acting character to a previously applied migration promoting composition tends to at least partially override the effects of the migration promoting composition at the location where the migration limiting composition is applied. Thus, even if a substrate is treated uniformly with a migration promoting composition at a preliminary step, localized zones of reduced migration may be established across the substrate by the patterned application of effective amounts of a counter-acting migration limiting composition. Likewise, the substrate may be pretreated with a migration limiting composition and thereafter patterned with a counter-acting migration promoting composition. Thus, it is contemplated that the dye migration character of the substrate may be varied across the substrate by controlling the relative amounts of migration limiting and promoting agents at each position across the substrate. As will be discussed further hereinafter, this permits the controlled blending and containment of dye across the substrate to a degree which was not heretofore achievable.

According to one contemplated practice, the migration limiting composition includes a component which is counter-ionic to a component in the dye solution so as to react with the dye solution. Thus, according to the preferred practice, one of the dye solution or the migration limiting composition includes a cationic component while the other contains an anionic component. If desired, the dye solution may also include a constituent to enhance the reaction between the counter-ionic components of the dye solution and the migration limiting composition. Preferably the reactive ionic component in at least one of the migration limiting composition or the dye solution includes an ionic polymeric material, e.g., a material having a molecular weight of at least about 5,000, preferably at least about 10,000. More preferably, both the dye solution and the migration limiting composition include reactive polymeric materials having a molecular weight of at least about 5000 (more preferably at least about 10,000.). According to the most preferred contemplated practice, both the dye solution and the migration limiting composition include anionic reactive polymeric materials having a molecular weight of at least about 5000 (more preferably at least about 10,000.). Anionic polymeric constituents which are contemplated include biopolysaccharides such as xanthan gum, acrylic acid containing polymers, sodium alginate and the like. Cationic polymeric constituents include polyacrylamide copolymers having cationic groups, e.g., polyacrylamide copolymers containing primary, secondary and tertiary amines, both quaternized and non-quaternized. Non-polymeric anionic constituents include anionic surfactants such as sodium dodecyl benzene sulfonate and the like. Non-polymeric cationic constituents include cationic surfactants such as didecyl dimethyl amonium chloride and the like.

In a process wherein the dye solution and the migration limiting composition include reactive counter-ionic components, the cationic component (from one of the dye solution or migration limiting composition) and the anionic component (from the other of the dye solution or migration limiting agent) desirably come into contact with each other when the dye solution is applied to the textile material. An ionic interaction then occurs effectively controlling undesired migration of the dye. If, for instance, the cationic component and anionic component are allowed to react prior to application of the dye to the textile material the dye droplets which may be formed may make application of the dye in the desired pattern very difficult or even impossible. If, on the other hand, the cationic component and anionic component are caused to react after the dye solution has been in contact with the textile material for any appreciable period of time, the dye may have already migrated undesirably.

The desired interaction of the cationic component with the anionic component at zones where migration is to be limited may conveniently be accomplished by applying one of the ionic components to the textile material in the form of the migration limiting composition carried within an aqueous solution (which is disposed in patterned relation across the substrate relative to the migration promoting agent) prior to application of the dye solution in the desired pattern and then applying the corresponding counter-ionic material as a component of the dye solution in registry with the migration limiting agent. Thus if the cationic component is first applied to the textile material as a component of the migration limiting agent, the anionic component may be applied as a component of the dye solution. Similarly, if the anionic component is first applied to the textile material as a component of the aqueous solution, the cationic component may be applied as a component of the dye solution.

As mentioned above, a migration limiting composition containing one of the reactive ionic components is preferably applied to the textile material at zones where dye is to be contained prior to application of the dye solution. This ionic component, i.e., either the anionic component or cationic component, may typically be provided in the solution in an amount of from about 0.1 percent to about 10 percent, preferably from about 0.2 to about 5 percent, by weight based upon the weight of the aqueous solution. A wide range of additional textile dyeing pretreatment chemicals may also optionally be provided in the aqueous solution so long as those chemicals do not interfere with the ionic interaction as discussed above. Examples include, for instance, wetting agents, buffers, etc. Ideally the pH of the aqueous solution may be from about 3 to about 9, although the pH is not critical.

The amount of solution carrying the migration limiting composition applied to the textile material may vary widely from an amount sufficient to thoroughly saturate the textile material to an amount that will only barely moisten the textile material. The amount of cationic or anionic component provided may vary widely depending upon the molecular weight, number of ionic groups, etc. In general the amount of migration limiting composition applied may be from about 1 percent to about 500 percent, preferably about 5 percent to about 300 percent and most preferably about 50 percent to about 200 percent by weight based upon the weight of the textile material.

After application of the migration limiting composition in a desired pattern, the textile material may be dried prior to application of the dye solution or alternatively the dye solution may be applied directly without prior drying of the textile material.

Of course, it is to be understood that alternative migration limiting compositions may be applied in patterned relation across the substrate. By way of example only, and not limitation, it is contemplated that a process as described in U.S. Pat. No. 4,808,191 (incorporated by reference) may be used wherein an aqueous solution of a metal salt having a charge of +2 or more is applied to the substrate after which an aqueous dye solution containing dye and thickening agent which will form a complex with the previously applied metal salt is applied in a pattern across the substrate.

The complex coordinating with the dye thereby inhibits migration of the dye substantially beyond the boundaries of the pattern. It is believed that in such a process that as a result of the pretreatment of the textile material to be dyed the metal salt binds to the fibers of the textile material, such that when the aqueous dye-thickener solution is subsequently applied, according to a desired pattern, the thickener forms a complex with the "fixed" metal and the complex coordinates with the dye. As a result, the dye molecules are stably bound, by virtue of the textile substrate-metal-thickener-dye complex, and dye migration by either of the diffusion or capillary action routes is inhibited. Potetially prefered metal salts include those of Aluminum, zirconium, hafnium, boron, magnesium, calcium, zinc, strontium, barium, gallium and beryllium.

According to the potentially preferred practice, in the event that such migration limiting compositions are used, it is contemplated that they are selectively applied in a patterned arrangement across the substrate at zones where migration limitation yielding high relief is desired rather than being disposed across the entire substrate as taught in the prior art. In addition, a migration promoting agent is preferably disposed across at least a portion of the remainder of the substrate such that a combination of migration limitation and promotion is established simultaneously across the substrate.

It is also contemplated that other migration limiting compositions in the form of dye fixing/receiving compositions may be selectively applied at zones where high relief is desired. According to one contemplated practice, such a dye fixing/receiving composition includes a dye fixing agent and an ink receiving agent. In one embodiment, the dye fixing/receiving compound can include a compatible resin binder. Additional additives can be used with the dye fixing/receiving composition, such as whitening agents, antimicrobial agents, light stabilizers/UV absorbers, and lubricants.

In one embodiment, the dye fixing agent has a molecular weight of at least about 1000. In one embodiment, the dye fixing agent includes reactive amino compounds of highly cationic nature. One potentially preferred reactive amino compound is a compound having a high positive charge density (i.e., at least one (1) milliequivalents per gram). Reactive amino compounds that can be used in the present invention include compounds containing at least one primary, secondary, tertiary, or quaternary amino moiety. Additionally, the reactive amino compounds can contain a reactive group that is capable of reacting with the textile substrate or resin binder to form a bond thereto. Examples of a reactive group include epoxide, isocyanate, vinylsulphone, and halo-triazine. In particular, epichlorolhydrin polyamine condensation polymer may be particularly useful.

Ink receiving agents in the dye fixing/receiving compositions which may be useful include inorganic particles that receive the ink through adsorbancy or absorbancy. In one embodiment, the particle size of the ink receiving agent is equal to, or less than, about 10 microns. In another embodiment, the particle size of the ink receiving agent is equal to, or less than, about 3 microns. In yet another embodiment, the particle size of the ink receiving agent is equal to, or less than, about 1 micron. Examples of contemplated ink receiving agents include silica, silicate, calcium carbonate, aluminum oxide, aluminum hydroxide, and titanium dioxide. Bohemite alumina and silica gel may work particularly well as the ink receiving agents in dye fixing/receiving compositions, especially silica gel particles that have been treated to carry a cationic charge. In the case of silica gel particles, alumina surface coating and cationic silane surface modification may be desired. It is believed that the microporous nature of the bohemite alumia and silica gel allow further physical entrapment of a dye/pigment, such as an anionic dye/pigment, to afford improved wash fastness. In one embodiment, the inorganic particles have a porosity with a pore diameter from about 10 nm to about 200 nm.

In most formulations, the cationic charge from cationic reactive amino compounds is much greater than the cationic charge present on the inorganic particles. Therefore the mere presence of relative minor cationic charge on the inorganic particle would not significantly improve the dye/substrate interaction through cationic-anionic charge interaction. It is the combination of highly charged reactive amino compound and the microporous inorganic particles that further improves the migration limiting character of the treated substrate.

In one embodiment, the dye fixing agent typically will comprise from about 0.2% to about 20% by weight of the treated textile substrate. The ink receiving agent typically will comprise from about 0.2% to about 20% by weight of the treated textile substrate. In one embodiment, the dye fixing/adsorbing composition comprises from about 1% to about 20%, by weight, of the treated textile substrate. In another embodiment, the dye fixing/adsorbing composition comprises from about 1% to about 5%, by weight, of the treated textile substrate. In another further embodiment, the dye fixing/adsorbing composition comprises from about 5% to about 10%, by weight, of the treated textile substrate. Prior to placement on the textile substrate, the dye fixing/receiving composition is preferably in the form of a stable aqueous solution or dispersion.

As indicated, the dye fixing/adsorbing composition may be used in combination with a resin binder to limit dye migration. It is contemplated that the resin binder will be of a character to have a good bond with the fiber of the textile substrate. The resin binder can be a thermoplastic or thermosetting polymeric binder. Such a binder preferably has a glass transition temperature of below about 40° C. It is also preferred that the binder be durable when subjected to washing. Examples of resin binders include non-anionic or cationic latices, such as ethylenevinylacetate, acrylic, urethane polymer, polyamide, polyester, and polyvinyl chloride. In one embodiment, the resin binder comprises up to about 10% of the weight of the treated substrate.

It is believed that the dye fixing agent interacts with the ionic dyes in a charge type attraction, and that the dye fixing agent of the present invention typically will react with the fiber of the textile substrate to form a chemical bond with the textile substrate. In an embodiment where a resin binder is used, it is believed that the dye fixing agent will chemically bond with the resin binder, which bonds with the textile substrate. It is also believed that the ink receiving agent provides surface area for the ink from the ink jet printer to interact with the dye fixing agent, thereby facilitating the effects of the dye fixing agent.

Patterned application of a dye fixing/adsorbing composition as described above in registry with applied dyes may provide a printed textile with excellent color brightness and print resolution. These benefits may be particularly pronounced for aqueous pigment ink placed on the treated textile substrate on a pixel by pixel basis. More particularly, an aqueous pigment ink, with a pigment to ink ratio of about 10 to 1 or greater, by weight, of binder can be printed on a treated textile substrate to produce a water fast and weatherable printed image on the treated textile. Furthermore, pigment ink with about 10%, by weight, or less of binder can be printed onto the textile substrate with a treatment of a quanternary amino compound, with or without the inorganic particles, and provide a durable print. The quanternary amino compound can be secured to the textile substrate by a chemical bond, or any other appropriate method. It is believed that the treatment swells when it receives the aqueous ink. It is also believed that this swelling will increase the chances of the interaction between the pigment particles of the ink and highly cationic and porous features of the treatment.

It is to be understood that the term dye solution as used herein is meant to include a wide variety of dye liquors. Thus, for instance, the dyestuff or colorant may be dissolved in the aqueous medium or alternatively the dyestuff may not be completely dissolved but rather merely dispersed or suspended in the aqueous medium in a form conventionally regarded as suitable for pattern dyeing end use applications. In general, the dye solution which is to be applied to the textile material will contain one or more conventional dyestuffs including acid dyes, basic dyes, disperse dyes, reactive dyes, direct dyes, pigments and the like, depending upon the textile material to be dyed. Concentration of dyestuff in the dye solution may be in a range that is conventional for textile dyeing operations, e.g., about 0.01 to about 2, preferably about 0.01 to about 1.5 percent by weight based upon the weight of the dye solution. Other conventional ingredients and additives may be provided in the dye solution such as acidic materials, levellers, thickeners and defoaming agents, as will be apparent to those skilled in the art. The anionic or cationic component present in the dye solution may perform certain desired functions in the dye solution in addition to the primary function as described above. Thus it has been found in particular that such components may control the desired rheology characteristics of the dye solution which may vary widely depending upon the patterning technique employed.

Concentration of dyestuff in the dye solution is totally dependent on the desired color but, in general, may be in a range that is conventional for textile dyeing operations, e.g. about 0.01 to about 2 percent, preferably about 0.01 to about 1.5 percent, by weight, based upon the weight of the dye solution, exclusive of the thickener. The amount of thickener added to the aqueous dye solution is selected to provide the desired viscosity appropriate to the particular pattern dyeing method. It should be understood that, in the case of using a plurality of different color dye solutions, the aqueous thickener and its concentration may be the same or different in each dye solution, although it is generally preferred to use the same thickener in all dye solutions.

In general, dyes are combined with a number of other constituents such as thickening agents, defoamers, wetting agents, biocides, and other additives to arrive at the dye solution that is dispensed by the patterning device. In general, amounts of thickener range from less than 0.1 to about 3 weight percent, based on the weight of the dye solution. The requirements for patterning systems in which the dye solution is recirculated, such as is depicted in FIGS. 1 and 2, may be somewhat different from the requirements for drop on demand patterning systems in which the dye solution flows only when the dye solution is to be directed onto the substrate. Although the relative proportion and precise composition of such additives for optimum performance will vary for each type of patterning device, it has been found that the novel teachings disclosed herein are applicable to the formulation of colorants for both kinds of patterning devices, and are capable of yielding superior results irrespective of the manner in which the colorant solution is dispensed onto the substrate surface.

For the device shown in FIGS. 1–2, viscosities within the range of about 50 to about 1,000 centipoise have been shown to be useful. Other devices, for example, those devices that use a non-recirculating dye solution system, are believed to require, for best results, viscosities within the range of from about 800 to about 5000 centipoise, depending upon the operating conditions (e.g., dye pressure and applicator orifice size). Note that all viscosity values listed herein are intended to be measured by a Brookfield LVT viscometer with No. 3 spindle, running at 30 rpm and 25° C.

It has been found that by selectively patterning the substrate 25 with both migration enhancing compositions and migration limiting compositions that a substantially enhanced degree of freedom is established in the development of complex patterns. In particular, the selective application of treatment chemistries in combination with patterned dye application affords substantial freedom in the creation of sharp transitions between colored regions as well as the development of the controlled patterned blending of process colors.

By way of example only, and not limitation, in the break-out section 75 of FIG. 2, a colored block 70 as may be developed by the application of a multiplicity of dye solutions from multiple application bars is illustrated within a background zone 80. The colored block 70 may encompass several zones of shading and/or coloration 82, 84, 86 with different transitions between such zones. By way of example only, in a first zone 82, a substantially level deeply shaded solid coloration of high relief may be achieved by patterned application of one or more dye solutions from one or more application bars across a chemically treated substrate. As illustrated by the solid boundary line 90 between the first zone 82 and an adjacent second zone 84, a sharp, well defined boundary is present between the first zone 82 and the adjacent second zone 84.

According to the potentially preferred practice of the present invention, prior to application of a dye solution, the substrate 25 is treated with a migration limiting composition of cationic character such as an aqueous solution containing a cationic polyacrylamide copolymer, quaternized amonium salt or other suitable composition as previously described which is counter-ionic to an agent in the dye solution such that the migration limiting composition is disposed across the substrate 25 in a pattern which substantially encompasses the first zone 82. According to a potentially preferred practice, the disposition of the migration limiting agent will preferably be coextensive with the boundaries of the first zone 82. By way of example only, the controlled disposition of the migration limiting composition may be effected by jet impingement patterning using one of the application bars 15. In this regard it is to be understood that the migration limiting composition may be applied either directly across the surface of the substrate 25 or in overlying relation to a previously applied migration promoting composition of counter-acting character to the migration limiting composition. After the migration limiting composition is applied, at least one dye solution containing a dye with or without a thickening agent is applied in a desired pattern. The dye and/or any thickening agent is of ionic character to react with the migration limiting composition in covering relation to the first zone 82. Due to the reaction between the migration limiting composition and the counter-ionic component(s) in the dye solution, diffusion of the dye past the boundary 90 is substantially precluded.

By way of further example, within the second zone 84, the migration limiting composition may be present in combination with the migration promoting composition at relative concentrations so as to provide a migration character which differs from that of the first zone. That is, a controlled degree of pixel to pixel dye diffusion is permitted. Moreover, as illustrated by the gradually dispersed shading, it is possible to gradually change the degree of dye diffusion across the zone. In the illustrated exemplary practice, dye diffusion within the second zone 84 immediately adjacent the boundary line 90 may be substantially foreclosed by applying a dominating relative concentration of migration limiting composition across the substrate 25. However, as distance increases away from the boundary 90, the concentration of the migration limiting composition may be reduced relative to that of the migration promoting composition. Thus, dye diffusion between and among pixels is promoted leading to a "soft focus" appearance at locations removed from the boundary line 90. The controlled disposition of the migration promoting and migration limiting compositions can thus be used to impart a controlled shading or shadowing effect. The use of such a shading or shadowing effect may be used to bring high relief areas such as first zone 82 into sharp focus relative to surrounding soft focus zones thereby creating a three-dimensional visual impression.

As described above, the migration promoting and migration limiting compositions are preferably of a substantially counter-acting character such that the diffusion characteristics across the substrate may be tuned as desired by quantitative manipulation of the relative amounts of the migration controlling compositions. By way of example only, according to one contemplated practice, the entire surface of the second zone 84 may be pretreated with one of the migration promoting or migration limiting compositions. Thereafter, the other of the migration promoting or migration limiting compositions may be applied in a desired concentration pattern to completely or partially counteract the first-applied composition at different portions of the zone 84.

As illustrated by the broken boundary line 88 between the second zone 84 and an adjacent third zone 86, it is contemplated that the practice of the present invention may permit the gradual merger of one color zone into another. Moreover, it is contemplated that a much wider array of in situ blended colors may be realized using a small number of process colors. In particular, it is contemplated that by controlling the dye migration character at the substrate through the controlled combination of migration limiting and migration promoting agents, the in situ blending of colors to reach various intermediate shades may also be controlled to yield substantially level solid shades as illustrated by the substantially uniform shading across the third zone 86.

As will be appreciated from the preceding example, a wide array of combinations of dye, migration limiting composition and migration promoting composition across a substrate may be utilized to achieve different effects. Various combinations are illustrated both logically and positionally by the Venn diagram set forth at FIG. 2A. As will be appreciated, any of the zones including dye may be used alone or in combination with one or more zones which do not include dye (including the blank substrate) to achieve desired patterning. This is true even if the dyed zones do not overlap with zones containing migration promoting and/or limiting compositions since adjacent zones may nonetheless impact migration in those zones, thereby affecting appearance.

The practice of this process affords the ability to effectively blend process colors using an arrangement of so called "superpixels" (i.e groups of adjacent pixels that are used in the manner of individual pixels within a pattern). An example of this technique is as follows. If a pattern contains an area requiring a specific pink hue that is formed by the application of a white pigment and red dye in a specific, exaggerated proportion to each pixel within the area, and that hue requires a quantity of red dye to each pixel that is smaller than the delivery system can deliver, that pink hue can nonetheless be generated within a grouping of, say, two or four adjacent pixels, and that pixel grouping can be used in a manner similar to a single pixel to tile the requisite area within the pattern. By so doing, the delivery system may deliver, in this example, two or four times more red dye than would otherwise be required to form the desired proportion of red and other colorant if blending within individual pixels was being attempted, thereby overcoming any limitations in the delivery equipment which would otherwise prevent the delivery of extremely small relative quantities of a process color. In situ blending within such superpixels is provided by the applied combinations of migration limiting and migration promoting compositions with maximum blending taking place using just the migration promoting composition. Thus, the number of pixels comprising the superpixel may be adjusted from small to relatively large. In this regard, it is contemplated that a larger number of pixels making up a super pixel will preferably utilize extensive inter-pixel migration of applied dyes within the superpixel to achieve uniform coloring while a smaller number of pixels making up a super pixel will utilize less aggressive inter-pixel migration.

By way of example, in the event that various shades of a single process color or a blend of two or more process colors are desired, it is contemplated that the number of jets carrying each of the dyes to the substrate may be adjusted in combination with dye migration character at the substrate so as to yield a wide array of shades. In particular, if a deep solid color block of one of the process colors is desired, a dye solution having that shade is applied so as to fully saturate a segment of the substrate which has been treated to substantially prevent dye migration. Thus, the color of the applied dye solution at each pixel is not degraded by diffusion to adjacent pixels. However, if a lighter shade or a blended shade is desired, the dye migration character across the substrate may be enhanced by application of an increasing percentage of migration promoting agent while at the same time reducing the proportion of jets within each superpixel carrying dye of the original process color to the substrate. Thus, the dye jets of the original process color which do impinge the substrate are permitted to undergo controlled migration so as to either diffuse to adjacent undyed pixels or to engage in in situ blending with one or more dyes of different process colors applied at adjacent pixels within the super pixel.

The practical application of the above described practices is substantial. By way of example only, in FIG. 3, a landscape scene such as may be applied across a substrate using an apparatus as illustrated in FIG. 1 is shown. In such a scene, a substantially three-dimensional effect may be established by the controlled combination of high relief zones with loose saturation diffuse blended zones. In particular, elements 105 to be illustrated as being in the foreground or as particularly bright in color may be printed at zones of substantially migration limiting character such as described in relation to first zone 82 in FIG. 2. Conversely elements 107 which are to be illustrated as being in the background may be printed at zones of migration promoting character such as the third zone 86 in FIG. 2 corresponding to the background depth impression to be imparted.

By way of further example, in FIG. 4, a floral pattern is illustrated. By using the practices of the present invention a three dimensional character can be imparted by treating zones 105' which are to be illustrated in high relief at zones of substantially migration limiting character such as described in relation to first zone 82 in FIG. 2. The impression of such high relief may be augmented by the use of controlled shading at zones 109' such as by printing at zones of gradually varying migration character as described in relation to zone 84 in FIG. 2.

As will be appreciated, regardless of the migration character within a given zone, once a desired degree of blending has been achieved, it is desirable to rapidly and efficiently fix the dye at the substrate so as to preclude further undesired blending and/or migration. In the past, such fixation has been effected by a wide range of techniques including saturated and super heated steam, natural and forced air heating as well as heating using radiant and/or convective heat transfer mechanisms.

In accordance with a potentially preferred practice of the present invention, once a controlled degree of dye migration and/or in situ blending has been achieved, RF (radio frequency) electric fields may be applied to an effective controlled depth within the substrate as to effectively and rapidly heat the dyed portion of the substrate so as to prepare the dye for fixation. The parameters of the RF application are controlled so as to provide rapid directional heating to a controlled depth into the substrate while at the same time avoiding burning or other damage of structural components of the substrate material. It is contemplated that such RF heating treatment may be particularly beneficial in the treatment of a pile fabric such as a carpet or the like although it may also be used in treatment of other substrates. Thus, while the process will hereinafter be described through reference to treatment of a pile carpet fabric, such description is to be understood to be exemplary and explanatory only.

According to one aspect of the present invention, heating energy may be delivered to the substrate in the form of electric fields generated using a so-called "fringe-field" electrode system operated at frequencies within the RF range with alternating positive and negative electrodes disposed in opposing relation over the pile surface of the carpet. The operating frequency, and arrangement of electrodes is established so as to provide and maintain the desired heating energy level.

Referring to FIG. 5, an exemplary substrate structure 225 in the form of a cushion backed carpet or carpet tile as may be treated by RF heating is illustrated. In this exemplary construction, the substrate structure 225 is made up of a primary carpet fabric 212 formed from a plurality of pile yarns 214 tufted through a primary backing layer 216 such as a scrim or nonwoven fibrous textile of polyester or polypropylene as will be well known to those of skill in the art. A precoat backing layer 218 of a resilient adhesive such as SBR latex is disposed across the underside of the primary carpet fabric 212 so as to hold the pile yarns 214 in place within the primary backing 216. An adhesive layer 220 such as a hot melt adhesive extends away from the precoat backing layer 218. A layer of stabilizing material 222 such as woven or nonwoven glass is disposed at a position between the adhesive layer 220 and a cushioning layer 224 such as virgin or rebonded polyurethane foam or the like. A secondary backing layer 226 such as a nonwoven blend of polyester and polypropylene fibers is disposed across the underside of the cushioning layer 224.

As will be appreciated, the actual construction of the substrate structure 225 may be subject to a wide range of variations. Accordingly, the multi-layered construction illustrated in FIG. 5 is to be understood as constituting merely an exemplary construction representative of a carpet and that the present invention is equally applicable to any other construction of carpeting and or other textiles as may be desired. Carpet tile constructions are described for example in U.S. Pat. Nos. 6,203,881 and 6,468,623 hereby incorporated by reference herein.

In the event that the substrate structure is a carpet, the pile yarns 214 may be either spun or filament yarns formed of natural fibers such as wool, cotton, or the like. The pile yarns 214 may also be formed of synthetic materials such as polyamide polymers including nylon 6 or nylon 6,6, polyesters such as PET and PBT; polyolefins such as polyethylene and polypropylene; rayon; and polyvinyl polymers such as polyacrylonitrile. Blends of natural and synthetic fibers such as blends of cotton, wool and nylon may also be used within the pile yarns 214. In FIG. 5, the pile yarns 214 are illustrated in a loop pile construction. Of course it is to be understood that other pile constructions as will be known to those of skill in the art including cut pile constructions and the like may likewise be used.

As described above, a pattern configuration of migration controlling chemicals and dyes may be applied across the substrate 225 so as to develop desired patterning across the surface of the substrate 225. The patterning which is developed may be the result of discrete process colors in patterned relation across the substrate 225 and/or the controlled in situ blending of two or more process colors. Moreover, the patterning may be further controlled by substantially controlling the degree of permitted dye migration. Regardless of the patterning techniques which are utilized, it is desirable to have the ability to substantially arrest further dye migration and/or blending in a rapid controlled manner by fixing the dyes in place.

In accordance with a potentially preferred practice, it has been found that using an RF (radio frequency) heater permits the achievement of rapid and efficient temperature elevation to a controlled depth within the substrate so as to facilitate dye fixation at the dyed portions of the substrate. In operation, RF heaters introduce an alternating electric field within the item to be heated thereby causing water molecules within such material to rotate rapidly in an attempt to align with the changing electric field. Such rotation generates heat within the product thereby causing heating within the item.

Applicants have recognized that the proper application of RF heating may be utilized to enhance dye fixation across a carpet or other textile substrate material following the patterned application of dye solution to the pile yarns. In particular, it has been found that the application of RF electric fields may provide rapid heating so as to arrest dye diffusion in a rapid and controlled manner. Moreover, due to the fact that heating is carried out to a controlled depth, the energy transfer to the substrate is more efficient and the potential for damage to various construction layers underlying the dyed surface of the substrate is substantially minimized.

In application, the present invention preferably makes use of a so-called "fringe field" RF heating unit such as that which is shown schematically in FIG. 8. The RF application unit 230 includes a generator 232 connected to an arrangement of alternatingly charged elongate electrodes 234. In the potentially preferred construction, the electrodes 234 are in the form of rods extending above and transverse to a conveyor 236 which carries the substrate 225 through the heating zone. It has been found that by proper selection of the operational frequency and electrode configuration relative to the substrate, that proper surface heating and fixation may be achieved without the potentially detrimental occurrence of arcing between the electrodes and/or undue heating of structural elements below the surface. As illustrated in phantom lines, an application field is developed in a patterned arrangement between the alternating electrodes. The fields so generated extend an operative distance into the substrate 225 so as to provide the energy to effect molecular rotation within the field boundaries.

The substantially controlled operative depth of the field generated between the electrodes in relation to the various layers of a substrate composite structure is illustrated in FIG. 9. As shown, the operating frequency and electrode spacing are such that the effective electric field extends to a position just below the pile yarns so as to avoid any substantial heating of any underlying layers which may contain moisture.

The use of RF heating to enhance dye fixation is believed to promote the rapid fixation of the dye chromaphore at the pile yarns 214 such that even at relatively low concentrations of dye, a deeper shading is achieved at the visible surface of the pile yarns 214. This improvement in shade retention is illustrated in FIG. 10 wherein light reflection is measured at the yarn tips of carpet samples dyed with the same concentration of the same dye but where one sample undergoes dye fixation using RF preheating followed by steaming while the other sample undergoes dye fixation using steam fixation alone. The measure of reflectance along the Y axis is reported in terms of ADOBE PHOTOSHOP L values wherein a lower number represents a darker shade corresponding to enhanced light absorption and correspondingly reduced reflectance. As shown, at lower concentrations of dye application, the carpet treated with RF preheating exhibited darker shading. The difference in shading became less pronounced as increased concentrations of dye are applied. However, even at the higher dye application levels, the enhanced shading at the yarn tips within the carpet treated using RF preheating was measurable.

While the phenomena resulting in the enhanced coloration at the yarn tip is not fully understood, it is believed that the use of RF heating rapidly heats the dyed portions of the substrate to a level sufficient to arrest arrests the tendency of the dye solution to wick away from the application zones. Convective and/or conductive heating does not appear to provide the very early arrest of the dye migration which appears to be provided by RF heating. Thus, the use of RF heating has been found to substantially improve the definition of patterns across the substrate by preventing pixel to pixel diffusion from progressing beyond the point desired while also avoiding the occurrence of so called frostiness at the tips of the dyed yarns.

It is believed that in actual practice, the use of fringe field RF dye fixation may be utilized to substantially improve both the efficiency of the dye fixation process as well as the aesthetic appearance of the product formed thereby. A wide array of actual product formation practices incorporating RF heating to aid in dye fixation are contemplated. By way of example only, and not limitation, various procedures applicable to the treatment of carpet are illustrated in FIGS. 6 and 7.

According to a first contemplated practice, a substrate such as a carpet fabric of tufted or bonded construction including a plurality of outwardly projecting pile yarns is subjected to a dye application step during which dye is applied in a pattern across the surface. This application may be by any known technique although the controlled streaming of dye solutions wherein the dye is applied on a pixel by pixel basis may be preferred. Following application of the dye to the carpet pile, the pile is thereafter heated by RF heating using a fringe field RF heating unit so as to apply an activating electric field to a predefined depth within the carpet pile. The dye may be fixed at this step if desired. Following the RF heating step, the carpet is thereafter cooled. If desired, this cooling may be facilitated by use of a forced cooling unit.

In FIG. 7 the principal steps in a potentially preferred substrate dyeing and treatment process are shown. In this process, a substrate such as a carpet of tufted or bonded construction including a multiplicity of outwardly projecting pile yarns is pretreated by both a migration promoting composition as well as a counter-acting migration limiting composition as described above. Following the application of the migration controlling compositions, the dye is applied in a pattern across the carpet pile by any suitable technique. Following the dye application, the pile is preheated by a fringe field RF heating unit which applies an activating electric field to an effective depth within the carpet pile. Following the RF heating step, dye fixation is completed by application of steam heat. The carpet may thereafter be washed, dried and cooled prior to use.

It is, of course, to be appreciated that while several potentially preferred embodiments, procedures and practices have been shown and described, the invention is in no way to be limited thereto, since modifications may be made and other embodiments of the principles of this invention will occur to those skilled in the art to which this invention pertains. Therefore, it is contemplated by the appended claims to cover any such modifications and other embodiments as may incorporate the features of this invention within the true spirit and scope thereof.

We claim:

1. A dye accepting substrate comprising in combination:
   a surface;
   at least one dye solution disposed in a pixel-wise placement pattern configuration across at least a portion of the surface;
   a separately applied migration promoting composition disposed in a pixel-wise placement pattern configuration across at least a portion of the surface relative to said at least one dye solution, such that the migration promoting composition is adapted to promote migration of at least a portion of said at least one dye solution across the surface.

2. The substrate as recited in claim 1, wherein said at least one dye solution is of non-neutral ionic character.

3. The substrate as recited in claim 2, wherein said at least one dye solution is of anionic character.

4. The substrate as recited in claim 3, wherein the migration promoting composition is of substantially neutral or anionic character.

5. The substrate as recited in claim 1, wherein said at least one dye solution is of cationic character.

6. The substrate as recited in claim 5, wherein the migration promoting composition is of substantially neutral or cationic character.

7. The substrate recited in claim 1, wherein said dye solution comprises at least one dye stuff selected from the group consisting of acid dyes, basic dyes, disperse dyes, reactive dyes, direct dyes, and pigments.

8. A dye accepting substrate comprising in combination:
   a surface;
   at least one dye solution disposed in a pixel-wise placement pattern configuration across at least a portion of the surface;
   a separately applied migration promoting composition disposed in a pixel-wise placement substantially in registry with at least a portion of said at least one dye solution at predefined zones across the surface such that the migration promoting composition is adapted to promote migration of at least a portion of said at least one dye solution across the surface at said predefined zones.

9. The substrate as recited in claim 8, wherein said at least one dye solution is of non-neutral ionic character.

10. The substrate as recited in claim 9, wherein said at least one dye solution is of anionic character.

11. The substrate as recited in claim 10, wherein the migration promoting composition is of substantially neutral or anionic character.

12. The substrate as recited in claim 8, wherein said at least one dye solution is of cationic character.

13. The substrate as recited in claim 12, wherein the migration promoting composition is of substantially neutral or cationic character.

14. A dye accepting substrate comprising in combination:
a surface;
at least one dye solution disposed in a pixel-wise placement pattern configuration across at least a portion of the surface;
a separately applied migration promoting composition disposed in pixel-wise placement across at least a portion of the surface such that the migration promoting composition is adapted to promote migration of at least a portion of said at least one dye solution across the surface; and
a separately applied migration limiting composition disposed in effective amounts in a predefined pattern configuration across discrete zones of the surface relative to said at least one dye solution, such that the migration limiting composition is adapted to limit migration of at least a portion of said at least one dye solution across the surface.

15. The substrate as recited in claim 14, wherein said at least one dye solution is of non-neutral ionic character.

16. The substrate as recited in claim 14, wherein said at least one dye solution is of anionic character.

17. The substrate as recited in claim 16, wherein the migration promoting composition is of substantially neutral or anionic character.

18. The substrate as recited in claim 17, wherein the migration limiting composition is of substantially cationic character.

19. The substrate as recited in claim 18, wherein at least one of the dye solution and the migration limiting composition includes at least an ionic polymeric constituent selected from the group consisting of anionic and cationic polymeric materials.

20. The substrate as recited in claim 14, wherein said at least one dye solution is of cationic character.

21. The substrate as recited in claim 20, wherein the migration promoting composition is of substantially neutral or cationic character.

22. The substrate as recited in claim 17, wherein the migration limiting composition is of substantially anionic character.

23. A dye accepting substrate comprising in combination:
a surface;
a first dye solution of a first process color disposed in pixel-wise placement across at least a portion of said surface;
at least a second dye solution of a second process color disposed in pixel-wise placement across at least a portion of said surface;
a separately applied migration promoting composition disposed in pixel-wise placement across portions of the surface, wherein the migration promoting composition is adapted to promote migration of said first and second dye solutions to effect in-situ color blending of said first process color with at least a second process color in a predefined area across said surface.

24. The substrate as recited in any of claims 1–13 and 14–23 wherein the dye accepting substrate is subjected to radio frequency heating after application of at least one dye solution so as to initiate fixation of said at least one dye solution.

25. The substrate as recited in claim 24, wherein the radio frequency heating is effected by a fringe field radio frequency configuration.

26. A process for dyeing a surface of a dye accepting substrate, comprising the steps of:
applying a dye migration promoting composition and/or a dye migration limiting composition across said surface in pixel-wise placement;
applying in pixel-wise placement at least one dye solution across at least a portion of said surface; and
heating the dye accepting substrate after the applying steps to effect fixation of said dye solution to said surface.

27. The process of claim 26, wherein said dye migration promoting composition and said dye migration limiting composition are applied in a pixel-wise fashion using a jet dye machine having a drop-on-demand or recirculating mechanism.

28. The process of claim 26, wherein said dye solution comprises at least a dye stuff and a thickening agent, and said dye solution is an aqueous solution having a viscosity of about 50 to 5,000 centipoise.

29. The process of claim 26, wherein said surface is a carpet surface.

30. The process of claim 29, wherein said carpet is in the form of a carpet tile.

31. The process of claim 26, wherein said dye migration promoting composition includes at least one component having ionic character opposite to that of said surface.

32. The process of claim 26, wherein at least one of said migration promoting composition, migration limiting composition and dye solution includes an ionic polymeric constituent selected from the group consisting of biopolysaccharides, acrylic acid containing polymers, sodium alginate, and cationic polyacrylamide.

33. The substrate as recited in claim 23 further compromising a separately applied migration limiting composition disposed across at least a portion of said surface; and said migration limiting composition being adapted to prevent migration of said first and second dye solutions across at least a portion of said surface.

34. The substrate as recited in claim 23, wherein said in-situ blending is pixel-to-pixel color blending of at least 2 colors in adjacent pixels.

35. The process of claim 26, wherein said heating is affected by the use of radio frequency heating mechanism.

36. A dye accepting substrate comprising in combination:
a surface;
at least one dye solution disposed in a pixel-wise placement pattern configuration across at least a portion of the surface;
a separately applied migration limiting composition disposed in effective amounts in a predefined pixel-wise placement pattern configuration across at least a portion of the surface relative to said at least one dye solution, such that the migration limiting composition is adapted to limit migration of at least a portion of said at least one dye solution across the surface; and a dye migration promoting composition disposed across at least a portion of said surface such that the dye migration promoting composition is adapted to promote migration of at least a portion of said at least one dye solution across said surface.

* * * * *